United States Patent [19]

Mogavero

[11] Patent Number: 5,299,839
[45] Date of Patent: * Apr. 5, 1994

[54] CONNECTION AND/OR T-JOINT FOR FLEXIBLE TUBES

[75] Inventor: Cesare Mogavero, Cirie', Italy

[73] Assignee: Saiag Industria S.p.A., Cirie, Italy

[*] Notice: The portion of the term of this patent subsequent to Jun. 30, 2009 has been disclaimed.

[21] Appl. No.: 23,621

[22] Filed: Feb. 26, 1993

[30] Foreign Application Priority Data

Apr. 7, 1992 [IT] Italy .............................. T092A000319

[51] Int. Cl.$^5$ .............................................. F16L 17/02
[52] U.S. Cl. ..................................... 285/110; 285/156; 285/292; 285/371
[58] Field of Search ............... 285/156, 110, 292, 921, 285/371

[56] References Cited

U.S. PATENT DOCUMENTS

| | | | |
|---|---|---|---|
| 2,985,469 | 5/1961 | Bowman | 285/921 X |
| 5,033,775 | 7/1991 | Matte et al. | 285/156 X |
| 5,125,693 | 6/1992 | Mogavero | 285/292 X |

FOREIGN PATENT DOCUMENTS

| | | |
|---|---|---|
| 0080110A3 | 6/1983 | European Pat. Off. . |
| 0243216A1 | 10/1987 | European Pat. Off. . |
| 0286973A2 | 10/1988 | European Pat. Off. . |
| 0286973A3 | 10/1988 | European Pat. Off. . |
| 2738108 | 3/1979 | Fed. Rep. of Germany ...... 285/110 |
| 4102700A1 | 8/1992 | Fed. Rep. of Germany . |
| 93389 | 2/1959 | Norway .............................. 285/110 |
| 633351 | 12/1949 | United Kingdom . |
| 2230833 | 10/1990 | United Kingdom ................ 285/110 |

*Primary Examiner*—Dave W. Arola
*Attorney, Agent, or Firm*—Edward D. Manzo

[57] ABSTRACT

A connection for flexible tubes includes a rigid tubular insert with at least two ends onto which the ends of flexible tubes are force-fitted. A cover of plastics material is moulded over the tubular insert and over the ends of the tubes. At least one respective integral, circular sealing lip projects from the internal surface of the end of each tube and engages the external surface of the corresponding end of the insert.

4 Claims, 3 Drawing Sheets

CONNECTION AND/OR T-JOINT FOR FLEXIBLE TUBES

BACKGROUND AND SUMMARY OF THE INVENTION

The present invention relates to a connection and/or T-joint for flexible tubes, particularly for fluid circuits such as cooling systems for motor vehicles.

More specifically, the invention relates to a connection and/or T-joint including:
a rigid tubular insert with at least two ends,
at least two flexible tubes, the ends of which are force fitted onto the ends of the tubular insert, and
a cover of plastics material moulded over the tubular insert and over the ends of the tubes which are fitted onto the insert.

A connection and/or T-joint for flexible tubes of this type is described, for example, in prior Italian patent application 67534-A/90 in the name of the present Applicant.

The object of the present invention is to provide a connection and/or T-joint of the aforesaid type which can remain functional even when the fluid circulating in the tubes reaches quite high pressures, for example, of the order of tens of bars.

This object is achieved, according to the invention, by means of a connection and/or T-joint of the type specified above, characterised in that at least one respective integral, flexible, circular sealing lip projects from the internal surface of the ends of each tube and engages the external surface of the corresponding end of the tubular insert.

According to a further characteristic, the ends of the tubular insert have (in known manner) respective pluralities of external perimetral projections and (according to the invention) the at least one sealing lip at the end of each tube extends between two adjacent perimetral projections of the insert.

Conveniently, in known manner, the end of each tube has at least one respective external perimetral groove into which the moulded cover extends and, according to the invention, the internal lip at the end of each tube is formed substantially in the same cross-section as the groove.

BRIEF DESCRIPTION OF THE DRAWINGS

Further characteristics and advantages of the invention will become clear from the detailed description which follows with reference to the appended drawings, provided purely by way of non-limiting example, in which.

DETAILED DESCRIPTION OF THE INVENTION

Figure 1:
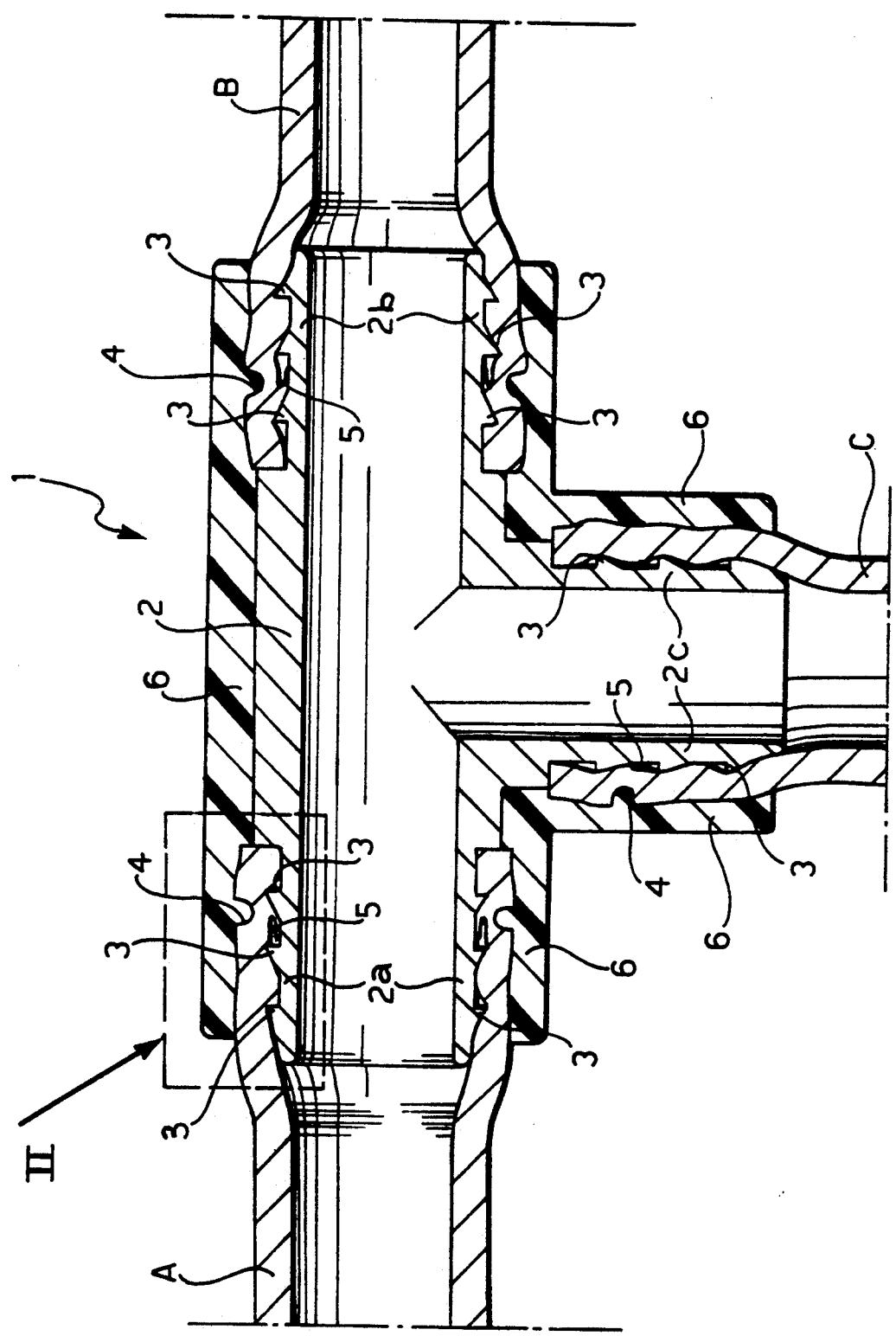
FIG. 1 is a sectional view of a connection according to the invention forming a T-joint between three flexible tubes.

In FIG. 1 three flexible tubes indicated A, B and C are joined together in a T-joint according to the invention, generally indicated 1. The tubes are made, for example, of an elastomeric material, possibly reinforced with internal or external fabric reinforcement.

A rigid T-shaped tubular insert, for example, of plastic material is indicated 2.

The insert 2 has three end portions 2a, 2b and 2c with respective pluralities of external axially-spaced perimetral projections 3 which, in the embodiment shown by way of example, have sawtooth-shaped cross-sections.

Figure 3:
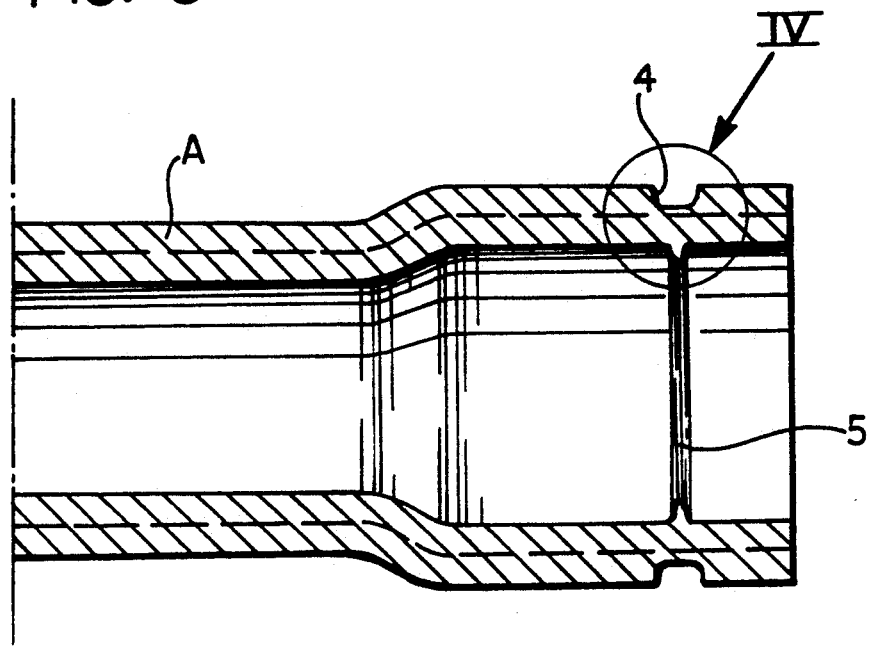
FIG. 3 is a sectional view of the end of a flexible shown before it is fitted onto the tubular insert of the connection according to the invention.
Figure 4:
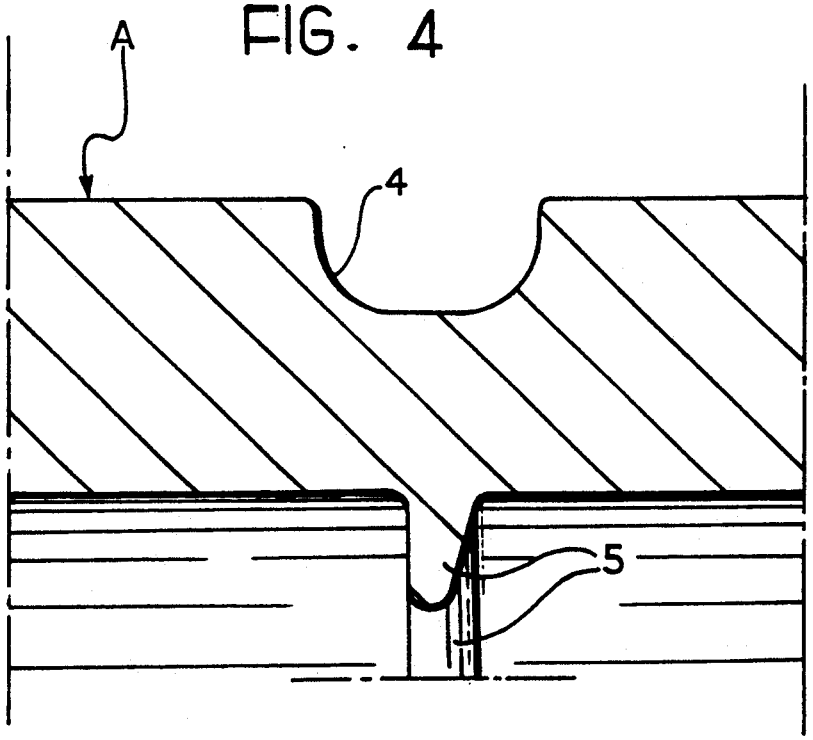
FIG. 4 shows the detail indicated IV in FIG. 3, on an enlarged scale.

The ends of the flexible tubes A, B and C are force-fitted onto the ends of the tubular insert 2. As can best be seen in FIGS. 2 to 4, the end of each tube has an external perimetral groove 4. Moreover, an integral, flexible, circular sealing lip, indicated 5, projects radially inwardly from the internal surface of the end of each tube. The lip is formed substantially in the same cross-section of the tube as the groove 4 (see FIGS. 3 and 4 in particular).

When the ends of the tubes A, B and C are force-fitted onto the ends 2a, 2b and 2c of the tubular insert 2, the internal sealing lip 5 of each end is disposed between two adjacent perimetral projections 3 of the corresponding end of the tubular insert. The lips are squashed against the outer surface of the end of the tubular insert, as can be seen in FIGS. 1 and 2.

Figure 2:
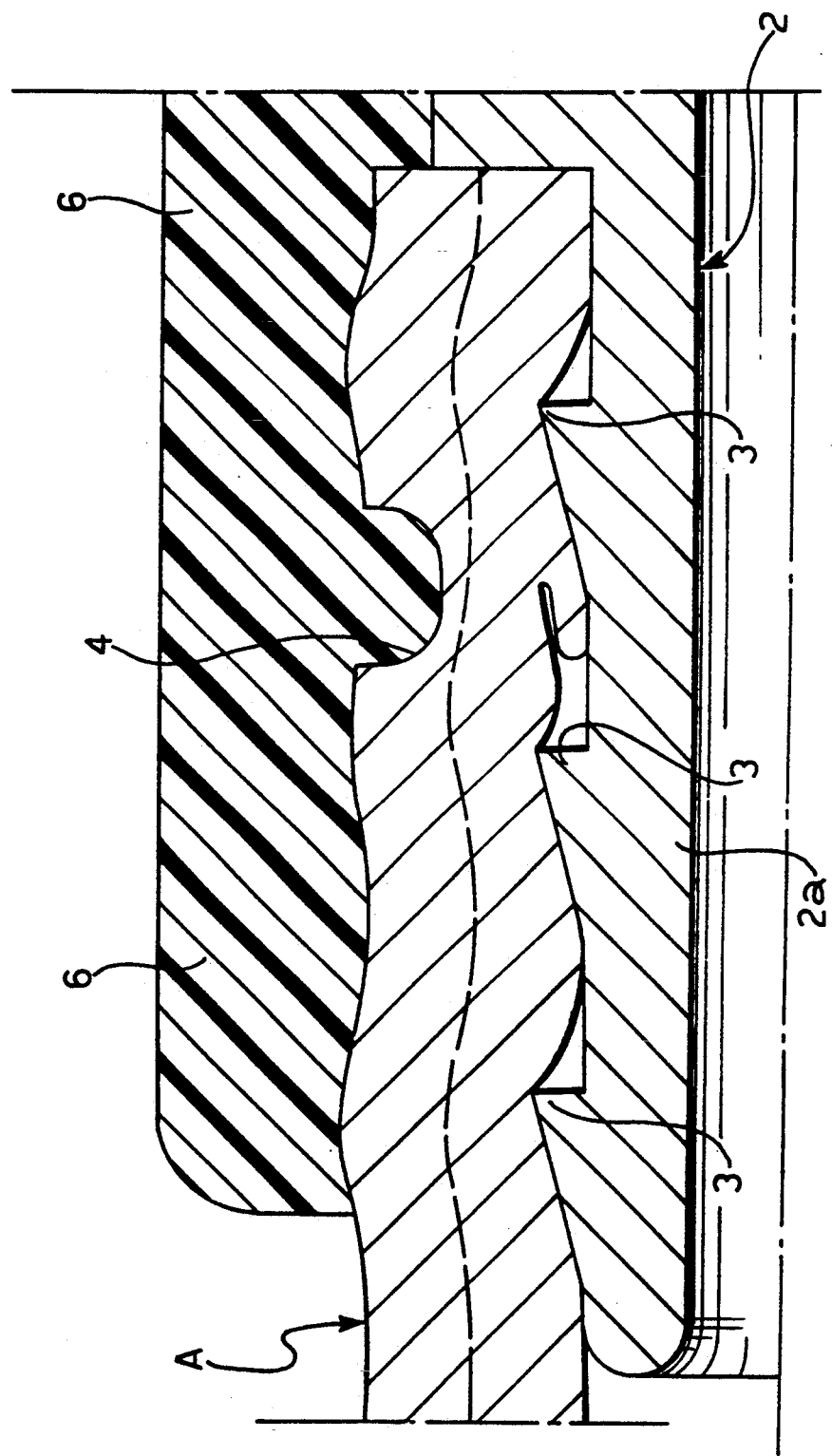
FIG. 2 shows the detail indicated II in FIG. 1, on an enlarged scale.

After the tubes A, B and C have been fitted onto the ends of the tubular insert 2, a cover of plastic material, indicated 6 in FIGS. 1 and 2, is moulded over the insert and over the ends. The cover may be made of a polyamide or of glass-filled polypropylene with a low coefficient of contraction.

At the moulding stage, the material which forms the cover 6 penetrates and thoroughly fills even the grooves 4 in the ends of the tubes.

The moulded cover 6 ensures that the joint between the tubes is fluid-tight.

If the pressure of the fluid circulating through the joint becomes excessive, the tubes A, B and C may expand. The fluid circulating through the joint can then penetrate between the outer surface of the end of the tubular insert and the internal surfaces of the ends of the tubes. The penetration of the fluid under pressure is then effectively blocked by the lips 5 on the ends of the tubes which, since they are bent and are urged against the outer surfaces of the ends of the tubular insert, act like shut-off valve elements. Further penetration of the pressurised fluid into the region in which the material of the cover 6 adheres to the outer surfaces of the ends of the tubes is thus prevented or at least greatly obstructed.

Tests carried out by the Applicant have shown that joints formed according to the invention can withstand extremely high excess pressures, particularly pressures of the order of tens of bars.

In embodiments of the invention which are not shown, the T-joint can house drain valves and/or plugs of plastic material or of metal, fitted in the rigid insert 2 or in the cover 6.

Moreover, the joint may be formed as a double T or with a curved main body from which one or more branches extend, or in other shapes usually used for conventional joints or, more simply, may be formed so as to join only two tubes.

Naturally, the principle of the invention remaining the same, the forms of embodiment and details of construction may be varied widely with respect to those described and illustrated purely by way of non-limiting example, without thereby departing from the scope of the present invention.

What is claimed is:

1. A connection for flexible tubes, comprising:
   a rigid tubular insert with at least two ends,
   at least two flexible tubes, the ends of which are force-fitted onto the ends of the tubular insert, and
   a cover of plastic material moulded over the tubular insert and over the ends of the tubes which are fitted onto the insert,
wherein at least one respective integral, flexible, circular sealing lip projects from the internal surface of the end of each tube and engages the external surface of the corresponding end of the insert.

2. A connection according to claim 1, wherein the ends of the tubular insert have respective pluralities of external perimetral projections wherein the at least one sealing lip at the end of each tube extends between two adjacent perimetral projections of the insert.

3. A connection according to claim 1, wherein the end of each tube has at least one respective external perimetral groove into which the moulded cover extends, and wherein the internal lip at the end of each tube is formed substantially in the same cross-section as the groove.

4. A connection according to claim 1, in the form of a T-joint.

* * * * *